United States Patent [19]

Silverstein et al.

[11] Patent Number: 5,642,125

[45] Date of Patent: Jun. 24, 1997

[54] TWO PATH LIQUID CRYSTAL LIGHT VALVE COLOR DISPLAY

[75] Inventors: Louis D. Silverstein, Scottsdale, Ariz.; Richard H. Bruce, Los Altos, Calif.

[73] Assignee: Xerox Corporation, Stamford, Conn.

[21] Appl. No.: 341,321

[22] Filed: Nov. 16, 1994

Related U.S. Application Data

[63] Continuation of Ser. No. 900,872, Jun. 17, 1992, abandoned.

[51] Int. Cl.$^6$ ........................................... H04N 9/31
[52] U.S. Cl. ........................... 345/87; 345/151; 348/751
[58] Field of Search ........................... 359/63, 64; 353/30, 353/31, 34; 345/1, 32, 87, 88, 151; 348/744, 750, 751, 752, 756, 757, 758; H04N 9/31

[56] References Cited

U.S. PATENT DOCUMENTS

| | | |
|---|---|---|
| 3,443,025 | 5/1969 | Gold . |
| 3,560,636 | 2/1971 | Barlow, Jr. . |
| 4,127,322 | 11/1978 | Jacobson et al. . |
| 4,345,258 | 8/1982 | Tsai et al. . |
| 4,416,514 | 11/1983 | Plummer . |
| 4,552,441 | 11/1985 | Dewey . |
| 4,758,818 | 7/1988 | Vatne ........................................ 345/151 |
| 4,843,381 | 6/1989 | Baron ........................................ 345/151 |

(List continued on next page.)

FOREIGN PATENT DOCUMENTS

| | | |
|---|---|---|
| 8807249 | 9/1988 | European Pat. Off. . |
| 58-209716 | 12/1983 | Japan . |
| 3261933 | 11/1991 | Japan . |
| 4127140 | 4/1992 | Japan . |

OTHER PUBLICATIONS

Young, R.A., "Getting More for Less: A New Opponent Color Technique for Two–Channel Color Displays", SPIE vol. 1250 Perceiving, Measuring, and Using Color (Santa Clara, CA., Feb. 15–16, 1990) pp. 132–143.

Glenn, et. al, Imaging System Design Based on Psychophysical Data, Proceedings of the SID, vol. 26 (1985) pp. 71–78.

Wyszecki and Stiles, Color Science: Concepts and Methods, Quantitative Data and Formulae, John Wiley & Sons, New York, (2nd Ed. 1982), Section 4.3.2, pp. 256–259.

European Search Report, EP 93 30 4640, The Hague, Sep. 27, 1993.

Primary Examiner—Richard Hjerpe
Assistant Examiner—Kara Farnandez Stoll
Attorney, Agent, or Firm—Judith C. Bares

[57] ABSTRACT

A full color electronic display device using two liquid crystal light valve image forming sources and having two optical paths is suitable for use in projection or direct view display applications. The two-path LCLV device generates two separate, spatially coherent color images which are combined by additive spatial superposition to produce a single, full-spectrum, composite color image. One image is composed from a spectral band of light from the long (red) and medium (green) wavelength regions of the visible light spectrum, and is formed by a liquid crystal image forming source having a high resolution which determines the effective spatial resolution of the final image. The second image is composed from a spectral band of light from the short (blue) wavelength region of the visible light spectrum, and is formed by a liquid crystal image forming source having a resolution less than that of the red and green image, thereby producing a brighter blue light image. These two optical paths and their properties are nominally matched to the characteristics of the chromatic and luminance processing channels of the human visual system. The device produces bright, sharp, and high resolution full-color images using a relatively simple, more easily aligned optical system. The composite image may be either directly viewed or optically projected using a conventional projection lens assembly onto an intermediate viewing surface. Several embodiments of the two-path liquid crystal light valve color display are described herein, each possessing specific features and advantages over existing electronic color displays.

13 Claims, 4 Drawing Sheets

U.S. PATENT DOCUMENTS

| | | |
|---|---|---|
| 4,886,343 | 12/1989 | Johnson . |
| 4,917,465 | 4/1990 | Conner et al. . |
| 4,983,032 | 1/1991 | Van Den Brandt . |
| 5,012,274 | 4/1991 | Dolgoff . |
| 5,032,007 | 7/1991 | Silverstein et al. . |
| 5,075,798 | 12/1991 | Sonehara et al. . |
| 5,124,818 | 6/1992 | Conner et al. ............... 359/53 |
| 5,189,534 | 2/1993 | McDonnell et al. ............ 359/45 |
| 5,237,435 | 8/1993 | Kurematsu et al. ............ 359/41 |

TWO PATH LIQUID CRYSTAL LIGHT VALVE COLOR DISPLAY

This application is a continuation of application Ser. No. 07/900,872, filed Jun. 17, 1992, now abandoned.

FIELD OF THE INVENTION

The present invention relates generally to full color display devices, and, more particularly, to a full color display device using liquid crystal light valve image forming sources for forming full color images in two optical paths. These two optical paths and their properties are nominally matched to the characteristics of the chromatic and luminance processing channels of the human visual system. The composite full color image device produces bright, sharp, and high resolution full-color images using a relatively simple, easily aligned optical system.

CROSS REFERENCE TO RELATED APPLICATIONS

A concurrently filed and commonly assigned U.S. patent application of Sprague, et. al., Ser. No. 07/900,813, now U.S. Pat. No. 5,504,597, entitled "Full Color Display With Light Coupling Lens Array", relates to a full color display which optically couples primary colored light emitters from an efficient colored backlight to an aligned matrix of addressable pixels in an image forming means. A concurrently filed and commonly assigned U.S. patent application of Sprague et al., Ser. No. 07/900,812, now issued as U.S. Pat. No. 5,315,418, entitled "Two Path Liquid Crystal Light Valve Color Display With Light Coupling Lens Array", relates to a full color display having two optical paths in which red and green light from an efficient colored backlight in one path is optically coupled to an aligned matrix of addressable pixels in a liquid crystal image forming means.

BACKGROUND OF THE INVENTION

Implementation of full color information systems for the display of high definition video information and complex pictorial and graphics images must be able to provide (1) high image resolution for precise edge definition and image sharpness; (2) high display and image luminance for maximum image brightness in a variety of display environments; and (3) precise, predictable control over color synthesis and reproduction using the largest color gamut available. Full color, high information content display systems must also be (4) small and compact, and (5) must be able to be manufactured at a low unit cost in order to be useful in a wide variety of applications. Existing color displays using a variety of technologies to produce full color, high resolution displays are deficient in one or more of these enumerated goals. For purposes of the discussion herein, the term "full color" display means a display which is capable of producing color from the full spectrum of visible light, and which uses at least three additive or subtractive primary colors to produce the full spectrum.

The dominant color production system used for the production of direct-view full color visual displays is an additive color system based on spatial juxtaposition, or spatial proximity, in which a single, full color picture element, or "pixel", of a displayed image is produced by the spatial integration of very small, juxtaposed primary (red, green, and blue) color sub-picture elements, or subpixels. "Pixel" and "image pixel" are defined herein as the smallest information element in a displayed image. The resolution of an image is determined by its pixel density. "Subpixel" and "image subpixel" are defined herein to mean a single primary color element that is used, along with two other primary color elements, to form a color from the full spectrum in an image pixel.

Examples of color displays which use additive spatial proximity color synthesis are the shadow-mask cathode ray tube (CRT) technology, and the active-matrix addressed color liquid crystal display (AMCLCD) technology, which utilizes a matrix of individually addressable liquid crystal light valves (LCLV) with integral red, green, and blue color filters for color image formation. Additive spatial proximity color synthesis requires high subpixel density (resolution) because the projected angular subtense of the primary color elements must be encompassed within the spatial integration zones of the human visual system in order for the eye to integrate a set of individual primary color subpixels into the single mixture color to be displayed in the image pixel.

From the perspective of the display's hardware, each primary color subpixel of an image pixel must be individually controllable for color, generally along some quantized range from a minimum of no light to the maximum light the display is capable of producing. Thus, a primary color image subpixel is the equivalent of, and will be referred to herein as a "display pixel". The hardware requirement in additive spatial proximity color synthesis for three "populations" of spatially separated primary color display pixels results in a reduction of available image sampling resolution of a display device of a given size, which, in turn, results in decreased image resolution. In addition, significant losses in display luminance and perceived brightness result from the fact that each of the three primary colors, without regard to its individual contribution to overall luminance or perceived brightness, generally occupies an equal amount of the available, active light emitting surface area of the display. For the display of large full color images in particular, additive spatial juxtaposition color synthesis alone is not an efficient method for generating full color images because of the excessive cost associated with the increased size of the display.

Another approach to color display systems uses subtractive color synthesis. In subtractive display systems, white (full spectrum) light is passed through successive layers of complimentary color filters, each layer being electrically controlled for absorbing a well-defined region of the spectrum. Examples of subtractive color filter technology suitable for direct view and projection color applications may be found in U.S. Pat. No. 5,032,007, issued to Silverstein, et. al., and in U.S. Pat. No. 4,917,465, issued to Conner at. al. While image resolution is generally of high quality as a result of full color control at the individual display pixel level, display quality may be affected by observer viewing angle, a phenomenon resulting from the parallax between the color filter layers. In addition, the use of subtractive, light absorbing techniques for producing colors makes it difficult to achieve sufficiently high overall luminance and perceived brightness, thus reducing overall display brightness. Moreover, the precise control of color rendition in subtractive display systems is complex because of the correlations existing between the color purity (i.e., saturation) and luminance components of colors generated by sets of subtractive color filters.

Still another method for generating full color images is based on additive spatial superposition in which a full color image is produced by the spatial registration of separate images, each comprised of typically one primary color, and optically fused into one full color image for viewing by the observer. Such a system is generally implemented using either CRT or LCLV technology, and is the predominant method used in color projection displays. An example of a color display utilizing additive spatial superposition is disclosed by Dolgoff in U.S. Pat. No. 5,012,274, in FIGS. 1 and 2, and at column 10; and in Jacobson et. al., U.S. Pat. No. 4,127,322. Typically, three images corresponding to red, green, and blue primary colors are generated, requiring three separate imaging (optical) paths, although multiple path systems with more than three optical paths are known in the art, as shown, for example, in the above-mentioned Jacobson, et. al. patent. Because each display pixel is equivalent to an image pixel and is capable of full color and luminance control, and because each of the color images is generated at full spatial resolution, the additive spatial superposition method of color synthesis achieves excellent image resolution and can also achieve relatively high overall luminance and perceived brightness. For these reasons, spatial superposition of separate color images provides the most feasible color synthesis method for producing large full color display images, such as those required in high definition television or comparable visual information display systems.

Both CRT-based and LCLV-based multiple (three or more) optical path, full color, spatial superposition display systems require precisely controlled hardware and optical elements to achieve exact image registration and alignment in order to maintain color purity and image sharpness. In addition, color display systems using projected superimposed images tend to be large, complex, and costly as a result of the separate optical paths and sets of imaging elements needed.

In particular, however, CRT-based full color spatial superposition display systems are deficient for a variety of reasons, but especially because CRT technology has inherent luminance limitations which typically result in dim images which must be viewed in a dimly lit environment, often on a special screen. Improving the brightness of CRT displays often results in lower resolution displays which are not suitable for the high information content required in many display applications.

Liquid crystal technology, then, provides the most flexible and feasible technology for implementing display systems for displaying full color, high resolution, high quality images of arbitrary size. A full color LCLV display utilizing spatial superposition for color synthesis must efficiently achieve enough brightness to display high quality images of varying sizes in a wide range of ambient lighting conditions, and must exhibit high resolution and an enhanced color gamut for high quality imagery to be displayed. Further, however, such a full color LCLV display device must overcome the problems of optical complexity and image alignment generally associated with devices utilizing spatial superposition color synthesis.

A full color display device must be capable of generating image information in three separate spectral bands which are approximately coincident with the spectral sensitivity functions of the three classes of color sensitive human visual photoreceptors. These human spectral sensitivity functions are broadly overlapping, but are generally described as having peak sensitivities in the short, medium, and long visual wavelength bands which roughly correspond respectively to blue, green, and red. It is generally known that the human visual system has a low degree of spatial sensitivity for blue light as compared to the other primary colors. See, for example, Glenn, et. al, *Imaging System Design Based on Psychophysical Data*, Proceedings of the SID, Volume 26 (1985) pp. 71–78, discussing the characteristics of human spatial sensitivity to different wavelength light energy. The eye's peak spatial response to blue light occurs at approximately one half the spatial frequency of peak spatial response for red or green light and half again the spatial frequency for achromatic, or luminance, signals, indicating that blue light contributes only a minor amount to image resolution factors such as image shape and spatial detail. As a result, neither the resolution nor the alignment of blue image pixels in an image created by additive spatial superposition is critical to image quality since misalignment is not easily detected by the eye. In color display systems using additive spatial juxtaposition color synthesis, the presence of blue display pixels in a proportion equal to red and green display pixels on the display surface of a LCLV color display may actually degrade overall image sharpness, since blue pixels contribute such a minor amount to image resolution.

At the same time, the human visual system's higher sensitivity to spatial resolution in red and green light than in blue light also means that the red and green display pixels must be at a high enough resolution in additive juxtaposition systems to integrate into one color, and that red and green images must be carefully aligned in three-path additive spatial superposition systems so that the eye will not be able to detect the separate red and green images at the image edges.

It is also known that the photopic response of the human eye to blue light is low and inefficient, and thus, blue light provides a much smaller contribution to overall perceived brightness than light from the red and green portions of the visible spectrum. See, for example, Wyszecki and Stiles, *Color Science: Concepts and Methods, Quantitative Data and Formulae*, John Wiley & Sons, New York, (2nd Ed. 1982), Section 4.3.2, pp. 256–259, discussing the chromatic and luminous efficiency characteristics of human sensitivity to different wavelength light energy. Thus, blue display pixels contribute little to the total luminance or perceived brightness of a LCLV color display, and, in fact, may actually decrease the potential luminance or overall perceived brightness of the LCLV color display, if represented in equal spatial proportions to the red and green subpixels. Thus, color display devices utilizing additive spatial methods for producing color which allocate equivalent spatial sampling density to the short wavelength (blue) primary display pixel sacrifice a potentially higher spatial resolution of the device, which is rendered solely by middle (green) and long (red) wavelength components, while at the same time limiting the effective brightness and color performance of the device by unnecessary high density sampling of blue display pixels.

However, while blue light contributes little to spatial resolution or brightness, it is fundamental that blue light cannot be ignored if the color display is to produce a full color image, since blue light contributes a disproportionately large amount to the perceived hue and saturation of colors, and can often be the limiting factor in achieving maximum luminance in full color displays. Thus, the highest possible luminance contribution of blue light improves the display's maximum luminous output and overall color balance or white point, and achieves a larger and more balanced color gamut. The present invention is premised on the discovery that the differential treatment of short wavelength (blue) light in LCLV color display technology affords an opportunity for improving color image resolution, enlarging the available color gamut, and improving the overall perceived brightness of a LCLV full color display, while at the same time reducing the complexity and image alignment problems associated with existing full color devices using spatial superposition color synthesis for fusing primary color images created in three optical paths.

The present invention recognizes that increasing the overall space-average intensity of the short wavelength light contribution by reducing the resolution of the blue light image increases the overall intensity contribution of the blue light to the final display image without reducing the effective image resolution. Space-average intensity in this context is defined as the average measured intensity of the light energy collectively emitted from individual display pixels over some small defined display area having a certain pixel resolution. The human visual receptors integrate the individual pixel light energy over the defined area, regardless of how the light is actually distributed. The larger the active light emitting display surface within this area, the brighter the area appears, since, for small areas of the color display under discussion, the perceived brightness is proportional to intensity or luminance. A certain portion of each LCLV pixel's area is devoted to fixed-size, opaque hardware overhead mechanisms needed to address each pixel and store voltage representative of display information. The space-averaged intensity measured for a given display size is thus a function of the remaining, nonstructural, pixel area which emits light. It follows, then, that increasing the area in which light is emitted will increase the space-average intensity of the blue light being emitted and perceived by the eye. Enlarging the display pixels, and consequently reducing the image resolution, means that each pixel is more transparent and has less overall pixel area taken up by the structural overhead mechanisms, thereby increasing the overall area available for emitting blue light and increasing space-average intensity for the blue image. In addition, this increased luminance of the blue image can be achieved efficiently without increasing the intensity of the light source, thus saving power and limiting heat production.

Increasing blue light intensity is also important in achieving a balanced white color, or white point, for the display. The brightest white point that a color display can achieve is limited by the amount of luminance (intensity) that can be achieved for the short wavelength light. That is, because of the eye's low luminous efficiency for short wavelength light energy, the luminance of the display's white point is, in effect, limited by the proportional luminance contribution of blue light to the white mixture color. Thus, increasing luminance for the short wavelength light provides a brighter white point as well. In addition, an increase in blue light intensity will increase the luminance range of all other colors which have a blue component. The present invention uses a separate optical path for providing a separate, brighter blue light image.

Attempts have been made to produce full color images by differentially treating light according to two separate wavelength bands. U.S. Pat. No. 4,886,343, issued to Johnson, discloses a liquid crystal display (LCD) unit in which a first (top) panel (image plane) of display pixel elements is used to control red and green portions of a displayed image using an additive spatial proximity technique, while a second (bottom) panel (image plane), having display pixels aligned with the first panel display pixels, controls the blue portion of the image through a subtractive superpositional technique. Overall perceived brightness of an image displayed on the Johnson device will be diminished by the absorption of light through the panels as a result of using the magenta and cyan filters, and as a result of using the subtractive light absorption method for controlling blue light. Moreover, as shown by FIG. 12 in Johnson, while the device utilizes light in three primary color wavelength bands, the color gamut achievable by the device is nonetheless severely restricted, since the display is incapable of producing colors in the blue region of the chromaticity diagram.

Conner et. al., in U.S. Pat. No. 4,917,465, disclose a display system comprised of stacking three supertwisted nematic (STN) birefringent LCD panels that are tuned to different subtractive primary colors (i.e., yellow, cyan, and magenta), with polarizers interposed between and sandwiched about the stacked panels. At columns 15 and 16, and in FIGS. 32 and 33, Conner et. al. disclose display systems using the stacked STN birefringent LCD panels and their associated polarizers and using split (two) optical paths. While STN technology may permit the liquid crystal cells to be multiplexed at the high rates necessary for high information content displays, their birefringent operating mode results in slow switching times and generally poor color performance. STN cells are unavoidably colored, generally incapable of producing black and white for high contrast, and capable of producing only a small spectrum of selectable colors without additional complex and light-absorbing optical elements such as polarizers to compensate for their poor color performance and contrast. The display system disclosed by Conner et. al., which uses polarizers to compensate for the STN cells, is likely to have limited luminous efficiency and poor contrast. In addition, the display system requires additional complex optical components to achieve optimal gray scale capability.

The present invention for producing full color images is also distinguishable from liquid crystal based color display devices which produce color images using light separated into two primary colors which follow two optical paths. Examples of such two path, two primary color devices include U.S. Pat. No. 4,345,258 and U.S. Pat. No. 4,983,032. These devices cannot produce full color images.

SUMMARY OF THE INVENTION

What is needed, therefore, is a full color LCLV technology which exploits the differential spatial and light energy sensitivity of the three classes of color sensitive human visual photoreceptors to improve color displays for the presentation of high definition video information and complex graphics images. Such a display must provide high image resolution for precise edge definition and image sharpness; high display and image luminance for maximum image brightness in a variety of display environments and in a variety of display sizes; and precise, predictable control over color synthesis and reproduction using the largest color gamut available.

One advantage of the present invention over full color liquid crystal devices having three optical paths, is that the present invention utilizes additive spatial superposition techniques in an optically simpler configuration by combining the long (red) and medium (green) wavelength image components, which contain almost all of the spatial information in the full-color image, in one red and green image forming source in fixed alignment in one optical path. This eliminates one optical path in the color display device, and reduces the critical need for precise image registration of the red and green images in a three-path system while still producing bright, sharply defined, and high quality full color images, Another advantage of the liquid crystal color display device of the present invention is the improved effective spatial resolution and the improved luminous efficiency over a device of comparable display pixel density and size which uses additive spatial juxtaposition of coplanar red, green, and blue subpixels, and over a multi-panel liquid crystal display device which uses subtractive color filter technology to form full color images. The liquid crystal color display device of the present invention achieves this advantage by utilizing a separate optical path for short (blue) wavelength light, and by forming the blue image with a lower sampling density, or resolution, in order to increase overall perceived image and display brightness, provide a brighter display white point, and to provide brighter color rendition for colors having a blue component.

Therefore, in accordance with the present invention, there is provided a liquid crystal color display for generating and displaying a composite full color image in two optical paths. The color display comprises a light source means which provides collimated red and green light components along a first optical path, and a collimated blue light component along a second optical path. First liquid crystal image forming means receive the collimated red and green light components from the light source means along the first optical path and form a red and green color image having a first image resolution. Second liquid crystal image forming means receive the collimated blue light component from the light source means along the second optical path and form a blue color image having a second image resolution. The second resolution of the second image forming means is lower than the first resolution of the first image forming means. The first and second color images are received by image combination means which combine them by additive spatial superposition into a composite full color image having the effective resolution of the first image. Image display means display the combined first and second images on a viewing surface.

In another aspect of the present invention, the first liquid crystal image forming means of the two path liquid crystal color display includes a first linear polarizer for polarizing the collimated red and green light components. A first twisted nematic liquid crystal cell has a plurality of individually addressable red and green display pixels for forming thereon, by additive spatial juxtaposition, the red and green image from the polarized red and green light components by selectively energizing each of the plurality of individually addressable red and green display pixels in order to modulate the polarized light from the red and green light components according to the red and green image to be formed. A first analyzer controls the light intensity of each of the display pixels in the red and green image. The second liquid crystal image forming means includes a second linear polarizer for polarizing the collimated blue light component. A second twisted nematic liquid crystal cell, also having a plurality of individually addressable display pixels for forming the blue image thereon from the polarized blue light component, selectively energizes each of the pixels in order to modulate polarized light from the blue light component according to the blue image to be formed. A second analyzer controls the intensity of the polarized blue light component in each of the pixels in the blue image.

In accordance with still another aspect of the present invention, there is provided a first liquid crystal image forming means which includes, along a first optical path, liquid crystal light intensity controlling means for controlling the light intensity of a first plurality of individual display pixels of the red and green image. First modulation means modulate the intensity of the collimated red and green light components in each display pixel according to the image to be formed. Liquid crystal color selection means controls the color selection of each of a second plurality of display pixels of the red and green image along a red to green colorimetric axis. Second modulation means modulate display pixels to select color from the collimated red and green light components according to the image to be formed. The liquid crystal light intensity controlling means and the liquid crystal color selection means are substantially aligned with respect to one another along the first optical path.

In a further aspect of the present invention, the liquid crystal color selection means includes a nematic liquid crystal material of a twisted configuration for forming the red and green image in the second plurality of individually addressable display pixels. The nematic liquid crystal material is capable of causing a rotation of the first polarization orientation of the collimated red and green light components to a second polarization orientation when the second modulation means energizes an individual display pixel.

BRIEF DESCRIPTION OF THE DRAWINGS

For a fuller understanding of the invention, reference is made to the following description taken in connection with the accompanying drawings, in which.

DETAILED DESCRIPTION OF THE INVENTION

Figure 1:
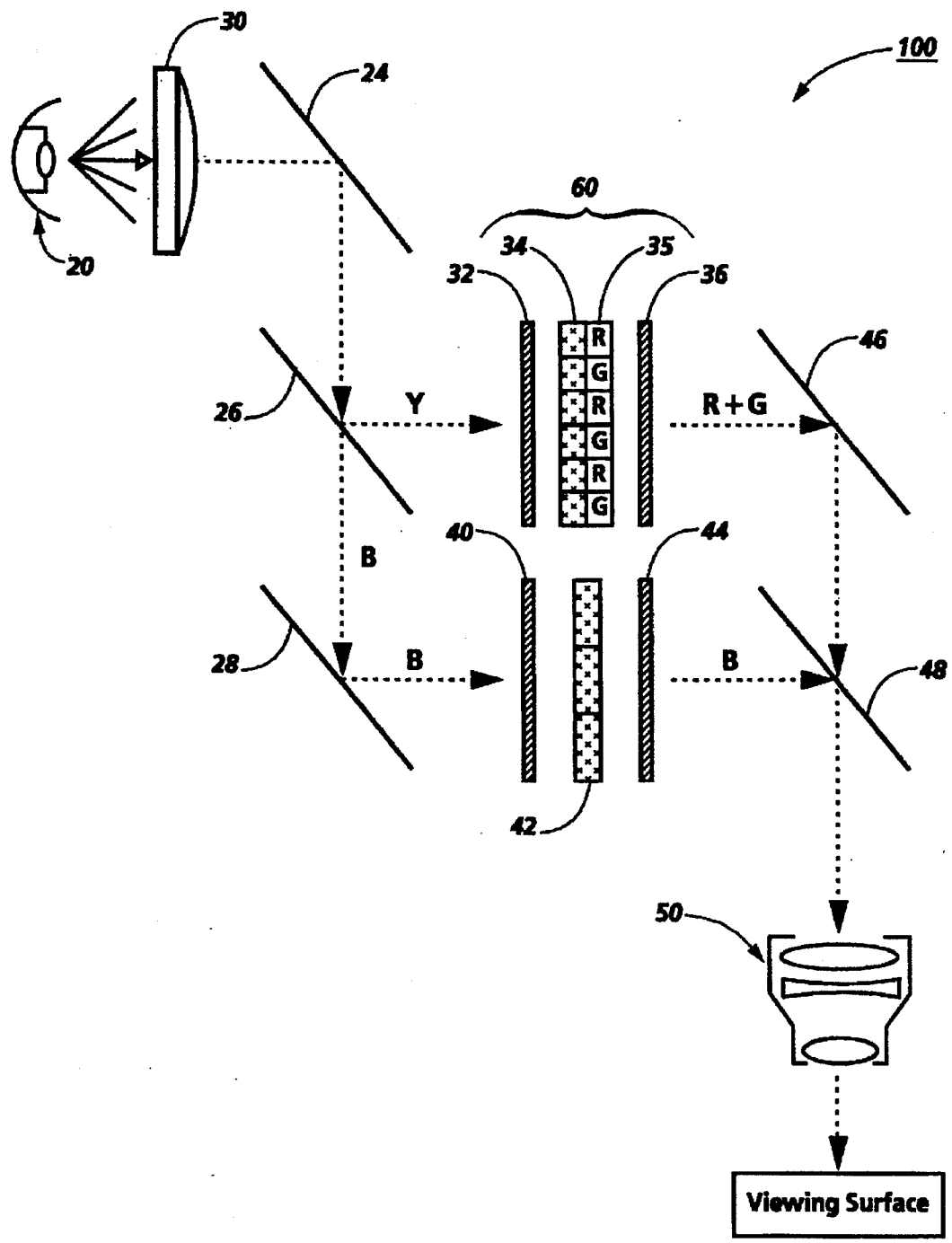
FIG. 1 is an optical schematic view of one embodiment of the two-path liquid crystal light valve color display of the present invention.

For a general understanding of the features of the present invention, reference is made to the drawings. In the drawings, like references have been used throughout to designate identical elements.

A. Single Light Source Embodiment Using Absorptive Color Filter.

FIG. 1 illustrates an embodiment of two-path liquid crystal light valve (LCLV) color display 100 of the present invention. In this first embodiment, a single light source 20 is used to provide illumination for the display. Light source 20 may provide a continuous, broadband spectral power distribution or may be constructed so as to produce spectral peaks in the red, green, and blue portions of the visible spectrum. The light emanating from light source 20 is initially passed through one or more optical elements collectively labeled as 30 on FIG. 1. Optical elements 30 may comprise any conventional light collecting, bundling, or collimating elements, such as a conventional spherical or parabolic reflector, condensing lens, or collimating lenses, according to the light requirements of the optical components of the specific implementation of the two path color display. Essentially, optical elements 30 serve to collect and bundle the light rays from light source 20 into a telecentric light ray bundle, as for example, via a condensing lens, or into parallel collimated light rays, as for example via one or more collimating lenses. For purposes of the embodiment illustrated in FIG. 1, the light emerging from optical element 30 will be referred to as collimated light, but the term is not intended to limit optical element 30 to one or more collimating lenses, and as noted above, optical element 30 may also include other light collecting and bundling optical elements.

The collimated light emerging therefrom is then passed to a heat removing optical element 24. An appropriate heat removing optical element is a cold mirror which reflects light in the visible portion of the spectrum and transmits infrared radiation, but it is intended that any single or set of optical elements may be used which are suitable for removing nonvisible infrared radiation from the broadband light emanating from light source 20. The nonvisible infrared radiation transmitted by optical element 24 is manifest as heat and may be dissipated by a convection heat sink or forced air cooling (not shown). Methods for handling heat generated by light source 20 are generally known in the art. See, for example, Dolgoff, U.S. Pat. No. 5,012,274, entitled, "Active Matrix LCD Image Projection System", at columns 7 and 8, lines 6 through 68 and lines 1 through 7, respectively.

The collimated light reflected by optical element 24 is passed to a yellow-blue dichroic mirror 26 which reflects middle (green) and long (red) wavelengths. Together, the red and green portions of the spectrum produce what is visually perceived as yellow light-hence the reflected light path from dichroic mirror 26 is hereafter referred to as the yellow path, labeled the Y path in FIG. 1. Dichroic mirror 26 transmits the short wavelength or blue portion of the visible spectrum. The blue light is subsequently reflected through a 90° angle by a front surface mirror 28 to enter the blue light path, labeled the B path in FIG. 1.

It will be understood by those skilled in the art that optical elements 30 may be positioned at other points in the red-plus-green and blue optical paths. For example, the broadband light emanating from light source 20 may be collimated after separation and reflection by mirrors 24, 26, and 28 with one optical element 30 placed at the entry to each of the optical paths.

To form the red and green components of a full-color image, the collimated yellow (combined red and green) light entering the Y path passes through a set 60 of optical elements. Specifically, the yellow light is linearly polarized by polarizer 32 prior to entering the twisted nematic liquid crystal (hereafter, TNLC) cell 34 where red and green image formation is accomplished. The operation of twisted nematic type liquid crystal cells is well known in the art, and certain components of the cell, such as the transparent substrates, conductive layers, and voltage source have been omitted from the figure. Briefly stated the twisted nematic cell varies the rotation of the axis of polarization of the yellow linearly polarized light to transmit plane polarized yellow light without rotation (zero degrees) when fully energized, and to cause a 90° (ninety degree) rotation when the cell is not energized. For voltages less than a predetermined level which represents the fully energized state, plane polarized yellow light incident upon TNLC cell 34 is rotated through an angle less than 90 degrees, depending on the voltage applied to cell 34.

TNLC cell 34 consists of a matrix of display pixels that may either be passively addressed via a conventional multiplexing scheme or actively addressed with an active matrix of thin film transistors (TFTs) or other conventional "latch-and-hold" circuit elements. Methods for activating liquid crystal display pixel matrices are known in the art. For example, Johnson, in U.S. Pat. No. 4,886,343 briefly describes such methods in column 5, lines 41 through 65, incorporated by reference herein. Dolgoff in U.S. Pat. No. 5,012,274 at columns 5 and 6, lines 66 through 68 and lines 1 through 19, respectively, provides a discussion, which is also incorporated by reference herein, of a thin film transistor active matrix LCD.

A pattern or matrix of red and green thin-film absorption or interference filters 35, labeled R and G in FIG. 1, typically fabricated as an integral layer with TNLC 34 as shown, is aligned with the matrix of display pixels to select out red and green image components from the composite yellow light path. Preferably, the arrangement of the red and green filters 35 alternates in both the horizontal and vertical dimensions. The output from TNLC cell 34 is then passed through conventional linear polarizer 36, which serves as the analyzer and enables the control of the light intensity at each red and green display pixel of TNLC cell 34.

To form the blue component of the full-color image, the collimated blue light entering the B path in FIG. 1 is linearly polarized by polarizer 40 prior to entering the twisted nematic liquid crystal (TNLC) cell 42. Image formation in the B path is similar to that of the Y path and is accomplished with TNLC cell 42, which is also a matrix of display pixels that may either be passively addressed via a multiplexing scheme or actively addressed with an active matrix of TFTs or other "latch-and-hold" circuit elements. The output from TNLC cell 42 is then passed through conventional linear polarizer 44, which serves as the analyzer and enables the control of the light intensity at each blue display pixel of TNLC cell 42.

Figures 2A, 2B, 4:
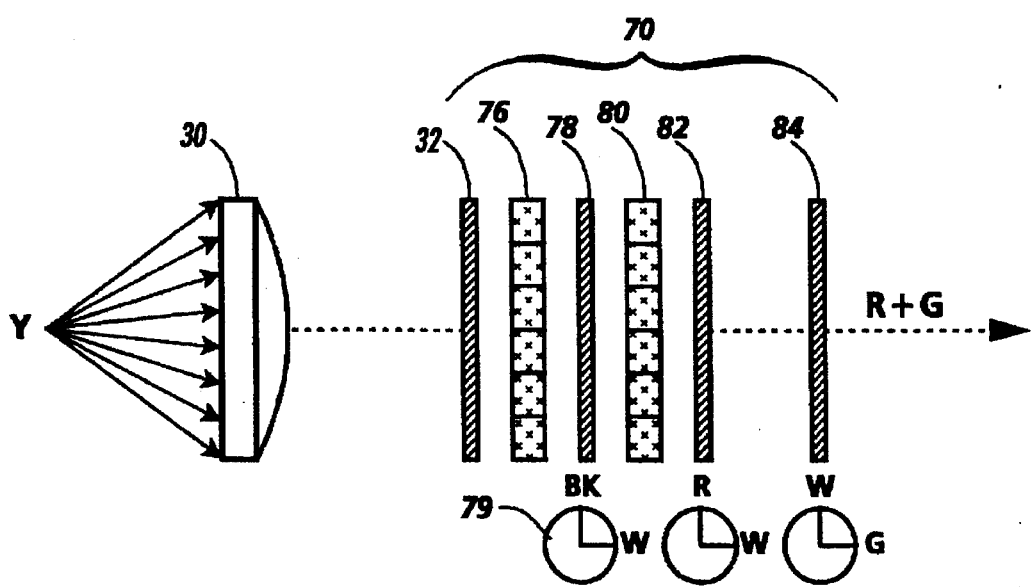
FIGS. 2A and 2B illustrate the different pixel resolutions of the images formed in each optical path of the two-path liquid crystal light valve color display of the present invention.
FIG. 4 is an enlarged schematic view illustrating a third, modified embodiment of the optical elements in the yellow (red plus green) light path of FIG. 1.

FIGS. 2A and 2B are simplified diagrams of the display pixel matrices for TNLC cells 34 and 42, respectively. FIG. 2A illustrates that TNLC cell 34 has a display pixel resolution of 8 by 8 display pixels, which in turn represents a red and green image resolution of 4 by 8 (or 8 by 4) image pixels. FIG. 2B illustrates that TNLC cell 42 has a display pixel resolution of 4 by 4 display pixels, which in turn represents a blue image resolution of 4 by 4 image pixels, since each display pixel is the equivalent of a single blue image pixel in the displayed image. To achieve the increased brightness in the color display from a brighter blue image, the display pixels in both the horizontal and vertical dimensions in pixel matrix of TNLC cell 42 are larger than the display pixels in the pixel matrix of red and green image forming TNLC cell 34. The larger display pixels in TNLC cell 42 provide a blue image with an increased space-average intensity (luminance). However, the blue image produced has an overall sampling density, or image resolution, which is less than the image resolution of the red and green image produced by red and green TNLC cell 34.

Preferably, the overall reduced sampling density of the display pixel matrix of TNLC cell 42 is in the range of one-half to one-fourth that of the display pixel matrix of red and green image forming TNLC cell 34. As shown in FIGS. 2A and 2B, the display pixel density reduction of TNLC cell 42 is one-half that of the display pixel matrix of red and green image forming TNLC cell 34 in both the horizontal and vertical directions, resulting in an overall display pixel density or resolution for TNLC 42 of one-fourth the display pixel resolution of TNLC cell 34, and an overall image resolution reduction for the blue image of one-half that of the image resolution of the red and green image. The research cited earlier relating the characteristics of human spatial sensitivity to different wavelength light energy suggests that a lower image resolution for the blue image component in the range of from one-half to one-quarter the image resolution of the red plus green image component is roughly proportional to the eye's respective peak spatial frequency responses to blue light and red or green light. However, it will be appreciated by those skilled in the art that other suitable reductions in overall pixel sampling density may work effectively in particular situations to provide a suitable blue image component with increased brightness without effecting the effective resolution of the full color image. However, it will also be appreciated by those skilled in the art that there will be a resolution reduction limit in a particular situation beyond which reducing the resolution of the blue image below that of the red and green image will result in reducing the effective resolution of the full color image.

Returning now to FIG. 1, to combine the color image components from the Y and B light paths into a full-color image, the light in the Y path, from the matrix of red and green display pixels, is reflected at 90° by front surface mirror 46 and then passes through a yellow-blue dichroic mirror 48. Light in the B path from the array of blue pixels is reflected from yellow-blue dichroic mirror 48. The combined full-color image is then ready for viewing on a direct-view surface, or it may be passed through conventional projection lens assembly 50, as shown, which magnifies the full color image and relays the image to an appropriate conventional front or rear viewing surface (not shown). Examples of suitable image projection methods may be found in Dolgoff, U.S. Pat. No. 5,012,274, at columns 13 and 14, and in Conner et. al., in U.S. Pat. No. 4,917,465, at columns 11 and 12. Those skilled in the art will appreciate that the two-path LCLV color display of the present invention may be configured as either a direct view display, or a projection display.

B. Multiple Light Source Embodiment Using Absorptive Color Filter.

Figure 3:
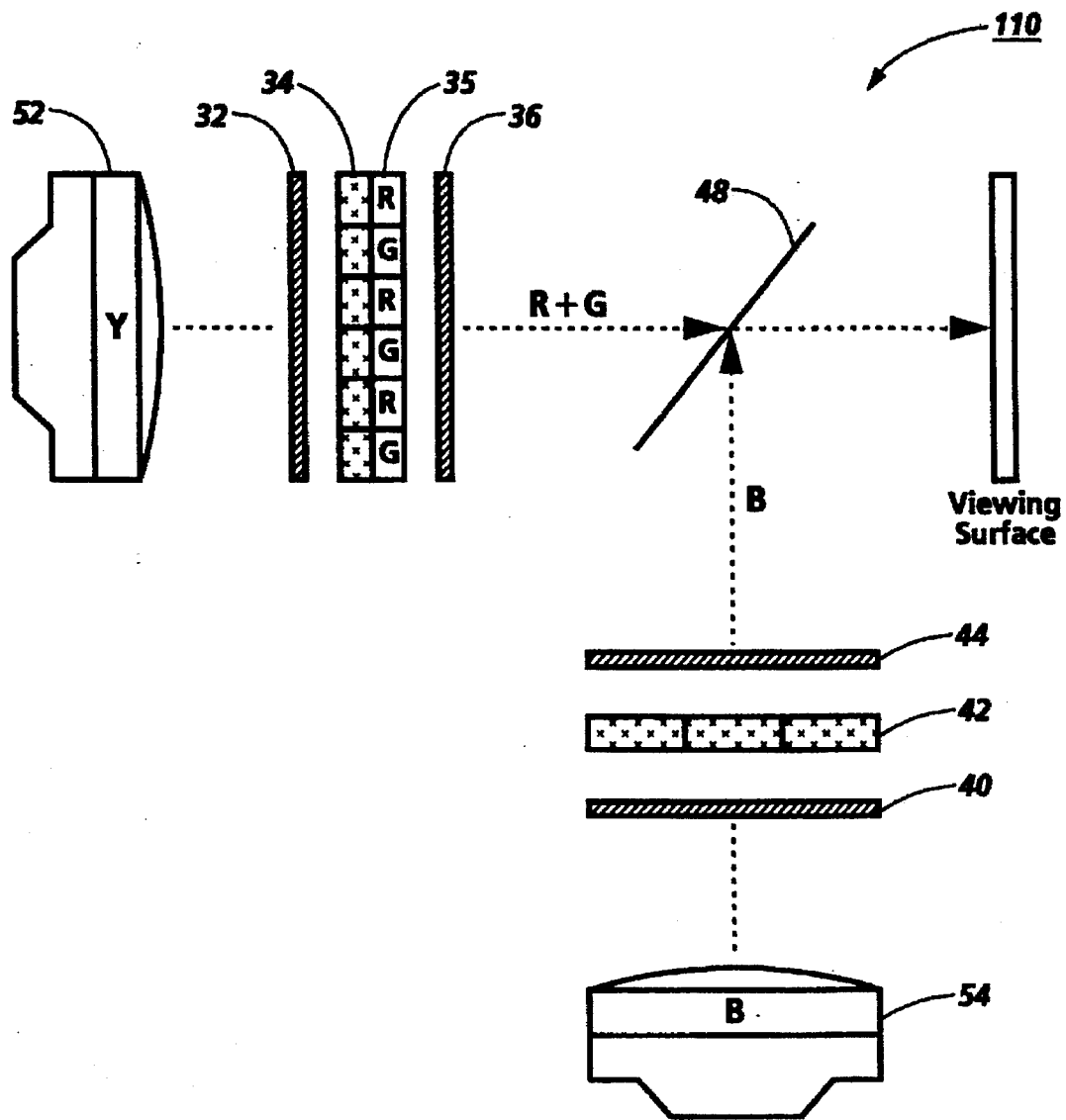
FIG. 3 is an optical schematic view of a second embodiment of the two-path liquid crystal light valve color display of the present invention.

Referring now to FIG. 3, there is illustrated two-path LCLV color display 110, an embodiment of the present invention which utilizes two separate light sources 52 and 54 in place of single light source 20 to provide illumination for the display. Two-path LCLV color display 110 has fewer optical elements than two-path LCLV color display 100 of FIG. 1, and may be more suitable in situations requiring a more compact display. Light source 52 provides light energy having a spectral power distribution in the long (red) and medium (green) wavelength portions of the visible spectrum, and is labeled "Y" in FIG. 3. Light source 54 provides light energy in the (short) blue wavelength region of the visible spectrum. Both light sources 52 and 54 include optical elements, not separately shown, for collimating or bundling the light components as they enter the respective first and second optical paths. The individual yellow and blue light sources of the embodiment illustrated in FIG. 3 eliminate the light separating optical elements of FIG. 1.

To combine the color image components from the Y (red and green) and blue light paths into a full-color image, the light from the matrix of red and green display pixels passes through yellow-blue dichroic mirror 48. Light from the matrix of blue display pixels is reflected from yellow-blue dichroic mirror 48. The combined full-color image is passed to a viewing surface using any appropriate mechanism, such as the projection lens 50 of FIG. 1. Alternatively, for direct viewing of the combined image, a light diffuser in the form of an optical screen may be used to diffuse the light exiting the display in a manner to meet the requirements of the application so that the combined image would be visible to a human observer at substantially all on-axis and off-axis viewing angles. Such a screen could be a light scattering device such as ground glass which would isotropically diffuse the image. The screen could also be a lenticular lens which would direct the light in a preferred direction or directions. The use of ground glass or lenticular lenses as screen materials is well known in the art.

It can be appreciated from the descriptions of two-path LCLV color display 100 and 110 of the present invention, illustrated in FIGS. 1 and 3, that two advantages are provided over a device of comparable image pixel density and size which uses spatial juxtaposition of coplanar red, green, and blue image subpixels. First, effective spatial resolution is improved since, as noted above, the long and middle wavelength light propagating along the Y light path provide virtually all of the spatial detail for color image reconstruction, and the resolution of the image created along this light path is not degraded by short (blue) wavelength image components. In addition, a much brighter display image is produced as a result of using larger sized, lower resolution blue image pixels, and as a result of eliminating an absorptive blue filter in the system. Moreover, the color display illustrated in FIGS. 1 and 3 may also be constructed with smaller TNLC cells having fewer display pixels than in a single path device, without sacrificing brightness or image quality because of the separate treatment of the blue light.

It can also be appreciated from the descriptions of two-path LCLV color display 100 and 110 of the present invention that two advantages are provided over a three optical path device using spatial superposition of three separate red, green, and blue images. Perhaps most importantly, the elimination of separate red and green optical paths reduces the critical nature of the registration of these paths, since, in the present invention, the red and green image components which contain almost all of the spatial information in the full-color image are constrained to a fixed alignment within a single red and green image forming source, and thus will never be misaligned. Moreover, the elimination of one optical path and associated optical elements reduces cost, complexity, and size of the color display device.

C. Embodiment Using Color Selecting Polarizers.

Turning now to FIG. 4, there is illustrated still another embodiment of the present invention which is encompassed by a different set 70 of optical elements for handling light in the Y light path to form the red and green components of a full-color image. In this third embodiment, overall perceived brightness in the color display which may be impaired by the red and green thin-film absorption or interference filters 35 (FIGS. 1 and 3) is improved by eliminating these filters. Yellow light (that is, combined red and green light) entering the Y path is initially passed through collimating optics 30 which contains optical elements (not shown) for producing substantially collimated light. Collimating optics 30 could comprise any conventional collimating elements, such as a conventional spherical or parabolic reflector, condensing lens, and collimating lenses. It will be understood by those skilled in the art that the optical alignment requirements of the embodiment illustrated in FIG. 4, discussed in more detail below, require substantial collimation of the red and green light components, and it is preferable to collimate the red and green light components immediately prior to the yellow light entering set 70 of optical elements which form the red and green components of the full-color image. The collimated light is then linearly polarized by conventional linear polarizer 32 prior to entering first TNLC cell 76.

First TNLC cell 76 modulates the intensity of the polarized, collimated light propagating through the Y path by rotating the axis of polarization of the incoming polarized light through an angle between 0° and 90°, depending on the voltage applied to the cell, to correspond with the desired intensity level of the light. Modulation in TNLC cell 76 is accomplished either passively or actively, in a manner similar to that described for TNLC cell 34 in FIG. 1. TNLC cell 76 is used in combination with linear polarizer 78, which acts as a polarization state analyzer, for intensity, or gray scale, control of the red and green display pixels.

By way of example, symbol 79 illustrates that polarizer 78 transmits the full spectrum of light polarized in a horizontal orientation, and absorbs light polarized in the vertical orientation. In the remainder of the description of the embodiment illustrated in FIG. 4 which follows, the light emerging from linear polarizer 78 in a horizontal orientation will be considered as being in a first polarization orientation as it enters the remaining optical elements of the set 70 of optical elements. It will be understood by those skilled in the art that references in the following description to polarization orientations of "vertical" and "horizontal" are for illustrative purposes only, and that other pairs of orthogonal polarization orientations are encompassed by the embodiment of the present invention illustrated in FIG. 4.

The intensity controlled and collimated polarized light emanating from linear polarizer 78 is then passed through a second TNLC cell 80 with a matrix of addressable display pixels. TNLC cell 80 is positioned with respect to TNLC cell 76 such that the matrix of addressable display pixels of TNLC cell 80 is substantially aligned with the matrix of addressable display pixels of TNLC cell 76. Because the polarized light emanating from the linear polarizer 78 is substantially collimated, light passing from an individual display pixel in TNLC cell 76 will be optically aligned with a corresponding display pixel in second TNLC cell 80. TNLC cell 80 controls the selection of color along the red-green colorimetric axis by rotating the axis of polarization of the incoming polarized light through an angle between 0° and 90°, depending on the voltage applied to the cell. Selection of colors along the colorimetric axis from red through green is accomplished with two orthogonally oriented color polarizers 82 and 84 which are thin sheet materials with dyes which function as color-specific light analyzers of the polarized light passing through them. First color polarizer 82 absorbs light with a vertical orientation except for red light, so that white light polarized in a vertical orientation (i.e., orthogonal to the first polarization orientation) is transmitted as red light. Light polarized in a horizontal orientation (i.e., in the first polarization orientation) is not absorbed, so both red and green light along this Y optical path polarized in the horizontal orientation is transmitted. Second color polarizer 84 transmits both red and green light with a vertical orientation and transmits only green light for polarized light in the horizontal orientation. Intensity controlled and collimated polarized light oriented between the two orthogonal states results in a combination of both red and green light passing through color polarizers 82 and 84, thereby permitting the selection of a range of colors along the red and green colorimetric axis. In this embodiment, blue light along the B path and the final combination of the red plus green and blue images, while not shown in FIG. 4, are treated in the same manner as described above in conjunction with FIG. 1.

Figure 5A:
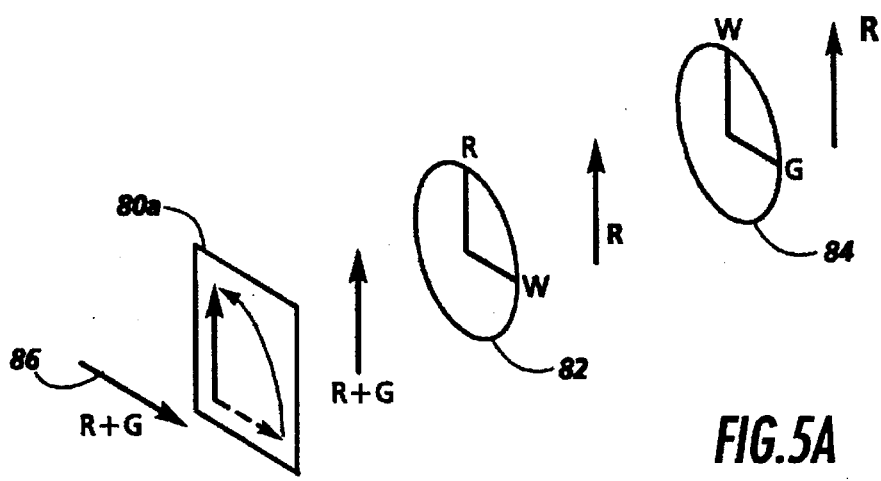
FIGS. 5A, 5B, and 5C are views illustrating the operation of the liquid crystal color selection means of the embodiment of the two path liquid crystal light valve color display illustrated in FIG. 4.
Figure 5B:
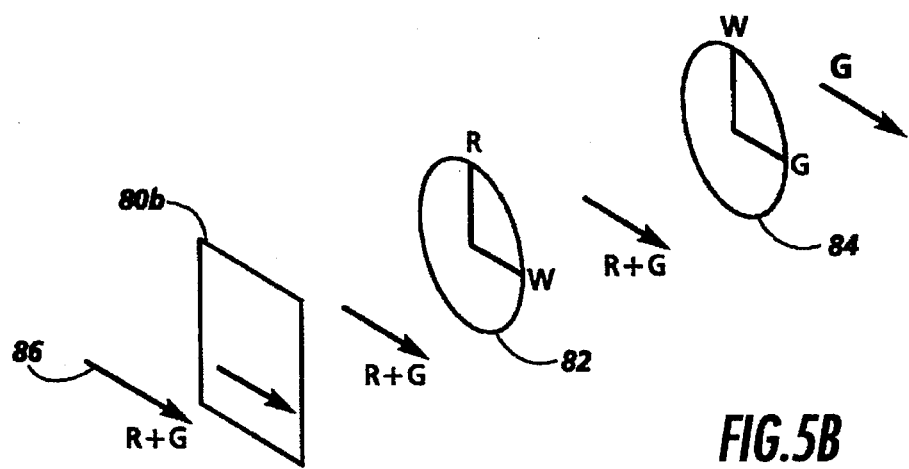
Figure 5C:
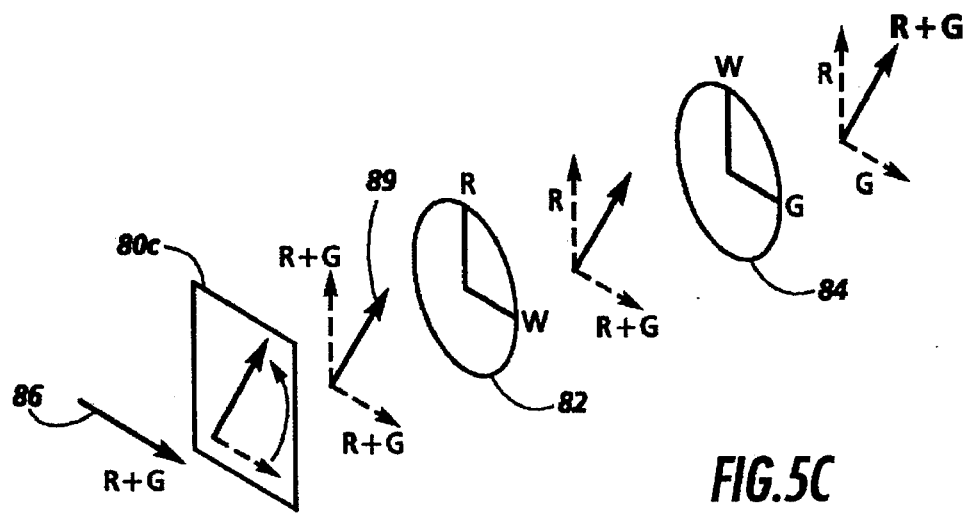

FIGS. 5A, 5B, and 5C illustrate the operation of second TNLC cell 80 and color polarizers 82 and 84 in more detail. With reference first to FIG. 5A, collimated red and green light, polarized in a horizontal (first) orientation by linear polarizer 78 (FIG. 4), is represented by arrow 86. The collimated, polarized light enters individual display pixel 80a in the display pixel matrix of TNLC cell 80. Through conventional addressing techniques briefly described above, the individual display pixel is addressed and energized to rotate the axis (plane) of polarization of the incoming light in a range from zero degrees (0°) when the display pixel should produce a pure green hue to ninety degrees (90°) when the display pixel should produce a pure red hue, depending on the voltage applied to the cell. In FIG. 5A, display pixel 80a represents a red hue pixel in the final red plus green image. The collimated, polarized red and green light represented by arrow 86 is rotated 90° (ninety degrees) from its horizontal orientation to represent the color red. Light exiting LCLV display pixel 80a then enters first color polarizer 82. Color polarizer 82 has a red light transmission axis in the vertical orientation, as shown by the vertical line labeled "R" in polarizer 82, and its function is to select red light. Color polarizer 82 transmits red light polarized in the vertical orientation (i.e., orthogonal to the first, or horizontal, orientation), blocks green light polarized in the vertical polarization orientation, and transmits broadband (white) light polarized in the horizontal orientation, as shown by the horizontal line labeled "W" in polarizer 82. In the case of the light emanating from display pixel 80a in FIG. 5A, the vertically polarized red light will pass through color polarizer 82, and vertically polarized green light will not be transmitted.

The transmitted red light from color polarizer 82 then enters second color polarizer 84. Color polarizer 84 has a green transmission axis in the horizontal orientation, as shown by the horizontal line labeled "G" in polarizer 84 (i.e., orthogonal to the vertical polarization orientation of color polarizer 82). Color polarizer 84 transmits green light polarized in the horizontal orientation, transmits broadband (white) light polarized in the vertical orientation, and blocks red light polarized in the horizontal orientation. Thus, the function of color polarizer 84 is to select polarized green light having a horizontal orientation. In the case of the red light emanating from color polarizer 82 in FIG. 5A, which is still in the vertical orientation, the red light will be transmitted through color polarizer 84.

Similarly, FIG. 5B illustrates the propagation of light through TNLC cell 80 and color polarizers 82 and 84 when display pixel 80b represents a green hue display pixel in the final red plus green image. Collimated light, polarized in a horizontal orientation by polarizer 78 (FIG. 4) and shown by arrow 86, enters LCLV display pixel 80b and is rotated 0° (zero degrees) from its horizontal orientation to represent a green color. Light emanating from display pixel 80b thus remains polarized in the first (or horizontal) orientation. Color polarizer 82 will transmit both red and green light in a horizontal orientation, so the red and green light emanating from display pixel 80b emerges from color polarizer 82. Color polarizer 84 transmits only green light polarized in a horizontal orientation, and so the red light polarized in the horizontal orientation is blocked, and only green light emerges from color polarizer 84.

Finally, FIG. 5C illustrates the propagation of light through TNLC cell 80 and color polarizers 82 and 84 when display pixel 80c represents a color between the red and green colors, such as a yellow hue image pixel, in the final red plus green image which exits the Y path. Collimated light, polarized in a horizontal orientation by polarizer 78 (FIG. 4) and shown by arrow 86, enters LCLV display pixel 80c and is rotated 45° (forty-five degrees) from its horizontal orientation to represent the desired yellow hue. The polarized red plus green light emerging from LCLV display pixel 80c, shown by arrow 89, is actually composed of vertically polarized red and green light components and horizontally polarized red and green light components, as shown by the dotted line vectors labeled "R+G". The polarized red plus green light then enters color polarizer 82. Color polarizer 82 transmits the red light components polarized in a vertical orientation, transmits both red and green light components polarized in a horizontal orientation, and blocks the green light components polarized in the vertical orientation. Color polarizer 84 transmits the green light components (vectors) polarized in the horizontal orientation, blocks the red light components polarized in the horizontal orientation, and transmits the red light components polarized in the vertical orientation. In this manner, polarization vectors oriented between the two orthogonal states result in a combination of quantities of both red and green light components passing through color polarizers 82 and 84, thereby permitting the selection of a range of colors along the red and green colorimetric axis.

It can be appreciated from this description of a different set 70 of optical elements for handling the light propagating through the Y path of two-path LCLV color display 100 that many of the advantages described in conjunction with the first embodiment illustrated in FIG. 1 are also preserved in the third embodiment illustrated in FIGS. 4 and 5. However, luminous efficiency and overall perceived brightness of the final full color image will likely be improved over the first embodiment shown in FIG. 1, since more light is lost through absorption by the red and green color filters in FIG. 1 than by the light absorption in the color polarizers 82 and 84. Overall luminous efficiency in the third embodiment, largely determined by the degree of light collimation required, could be comparable to a three-path, three image full color display device.

In addition, the third embodiment enables full color control along the red and green colorimetric axis at each addressable display pixel, rather than from combining separate red and green display pixels in one TNLC cell. Thus, each addressable red-to-green display pixel is the equivalent of an image pixel in the displayed image. This feature of the third embodiment of the two-path color display provides flexibility in display design to meet a variety of design goals. For example, image resolution and quality can be improved, without sacrificing color control, over a similarly sized LCLV which uses additive juxtaposition of display pixels to create a mixture color, since twice as many display pixels may be used to create an image that is the same size as an image which uses additive juxtaposition of display pixels to create a mixture color. Similarly, a full color display having greater overall perceived brightness than, but the same effective image resolution as, for example, the display illustrated in FIG. 1 is achievable by simply using larger display pixels having a larger transparent portion in each pixel. Alternatively, the display itself could be fabricated with a smaller TNLC cell with no loss of image resolution or brightness but at a lower cost, resulting from decreased fabrication costs and from the use of smaller optical elements. Finally, while this third embodiment uses two TNLC cells in one of the optical paths which must maintain careful display pixel alignment, this alignment is relatively easy to achieve and maintain using conventional techniques, since the cells are positioned very close together in the yellow optical path. This alignment is more easily achieved than the alignment of the red and green images required in a three optical path display.

D. Conclusions

In recapitulation, the two-path liquid crystal display system disclosed herein provides several advantages over prior art color display systems. The spatial superposition technique for producing the full color image provides improved effective spatial resolution over a device of comparable image pixel density and size which uses spatial juxtaposition of coplanar red, green, and blue subpixels since, as noted above, the long and middle wavelength (i.e., the yellow channel) elements provide virtually all of the spatial detail for color image reconstruction. Moreover, the full color display system of the present invention provides improved luminous efficiency over a device of comparable image pixel density and size which uses spatial juxtaposition of primary color subpixels because of the separate treatment of the red and green light, and because of the lower resolution and consequently larger size of the blue image pixel elements. Luminous efficiency is also improved by the elimination of an absorptive blue filter in the system, as found in some prior art color display systems. Further, the simplification of the two-path liquid crystal display system over full-color three-path devices requiring the superposition of separate red, green, and blue images by elimination of one optical path and associated optical elements reduces manufacturing costs, size, and the critical nature of the precise registration needed for three separate images in a three-path system. In the two-path system of the present invention, the red and green image components, which contain almost all of the spatial information in the full-color image, are constrained to a fixed alignment within a single red and green image forming source. It is therefore evident that there has been provided in accordance with the present invention, a color display that fully satisfies the objects, aims, and advantages hereinbefore set forth.

While the present invention has been described and illustrated in connection with specific embodiments, it will be understood that it is not intended to limit the invention to those embodiments. On the contrary, it is evident that many alternatives, modifications and variations will be apparent to those skilled in the art. Accordingly, the present invention is intended to cover all such alternatives, modifications, equivalents and variations as may be included within the scope of the invention as defined by the appended claims.

What is claimed:

1. A liquid crystal color display for displaying a full color image comprising light source means for providing a substantially collimated red light component and a substantially collimated green light component along a first optical path, and for providing a substantially collimated blue light component along a second optical path;

a first voltage responsive liquid crystal panel of liquid crystal material (first LC panel) positioned for receiving the substantially collimated red and green light components along the first optical path; the first LC panel including a first plurality of individually addressable, light modulating display pixels for forming a red and green color image having a first image resolution; each pixel in the first LC panel having a voltage modulation element associated therewith for modulating the red and green light components passing therethrough according to the color of the red and green image to be formed;

a matrix of red and green color filters, aligned with the first LC panel, for determining the color of the modulated red and green light components from each display pixel of the first LC panel to produce color in each display pixel; the matrix of red and green color filters being arranged so as to permit at least one of each red and green filter to be integrated by the human eye into a single color along a red to green colorimetric axis;

a second voltage responsive liquid crystal panel of liquid crystal material (second LC panel) positioned for receiving the substantially collimated blue light component along the second optical path; the second LC panel including a second plurality of individually addressable, light modulating display pixels for forming a blue color image having a second image resolution; the second image resolution of the blue color image being lower than the first image resolution of the red and green color image; each display pixel in the second LC panel having a voltage modulation element associated therewith for modulating the blue light component passing therethrough according to the blue image to be formed;

image combination means for receiving the red and green color image and the blue color image from the respective first and second optical paths for combining by additive spatial superposition into a composite full color image having an effective image resolution equal to the first image resolution; and image display means, disposed to receive the composite full color image from the image combination means, for receiving and displaying the composite full color image in a manner so as to be visible to a human observer.

2. The liquid crystal color display according to claim 1 wherein the image display means includes magnification means for magnifying and projecting the composite full color image onto a viewing surface.

3. The liquid crystal color display according to claim 1 wherein the second image resolution of the blue color image is in a range of from one-half to one-fourth that of the first image resolution of the red and green color image.

4. The liquid crystal color display of claim 1 wherein the liquid crystal material of the first and second voltage responsive liquid crystal panels is twisted nematic liquid crystal material.

5. A liquid crystal color display for displaying a full color image comprising light source means for providing a substantially collimated red light component and a substantially collimated green light component along a first optical path, and for providing a substantially collimated blue light component along a second optical path;

a first voltage responsive liquid crystal panel of liquid crystal material (first LC panel) positioned for receiving the substantially collimated red and green light components along the first optical path; the first LC panel including a first plurality of individually addressable, light modulating display pixels for controlling light intensity of a red and green color image; each display pixel in the first LC panel having a voltage modulation element associated therewith for modulating the red and green light components passing therethrough according to the light intensity of the respective display pixel in the red and green image to be formed;

a linear polarizer disposed along the first optical path for polarizing in a first polarization orientation the modulated red and green light components received from the first LC panel;

a second voltage responsive liquid crystal panel of liquid crystal material (second LC panel) positioned along the first optical path to receive the linearly polarized red and green light components from the linear polarizer; the second LC panel including a second plurality of individually addressable, light modulating display pixels for controlling color selection in each display pixel along a red to green colorimetric axis; each display pixel in the second LC panel having a voltage modulation element associated therewith for modulating the rotation of the polarized red and green light components passing therethrough from the first polarization orientation to a second polarization orientation according to the color of the respective display pixel in the red and green image to be formed;

wherein the second plurality of individually addressable display pixels of the second LC panel are substantially aligned with the first plurality of individually addressable display pixels of the first LC panel along the first optical path;

at least two color selecting dye polarizers disposed consecutively along the first optical path to receive the modulated red and green light components from each of the second plurality of display pixels of the second LC panel; the at least two color selecting dye polarizers having transmission axes oriented with respect to each other so as to be capable of using the modulated first and second polarization orientations to select in each display pixel one of substantially all colors along the red to green colorimetric axis;

a third voltage responsive liquid crystal panel of liquid crystal material positioned for receiving the substantially collimated blue light component along the second optical path; the third LC panel including a third plurality of individually addressable, light modulating display pixels for forming a blue color image; each display pixel in the third LC panel having a voltage modulation element associated therewith for modulating the blue light component passing therethrough according to the blue image to be formed;

image combination means for receiving the red and green color image and the blue color image from the respective first and second optical paths for combining by additive spatial superposition into a composite full color image; and image display means, disposed to receive the composite full color image from the image combination means, for receiving and displaying the composite full color image in a manner so as to be visible to a human observer.

6. The liquid crystal color display according to claim 5, wherein the at least two color selecting dye polarizers include a first color selecting linear polarizer for selecting red light; the first color selecting linear polarizer transmitting the red light component polarized in the second polarization orientation, absorbing the green light component polarized in the second polarization orientation, and transmitting the red and green light components polarized in the first polarization orientation; and a second color selecting linear polarizer for selecting green light; the second color selecting linear polarizer transmitting the green light component polarized in the first polarization orientation, absorbing the red light component polarized in the first polarization orientation, and transmitting the red and green light components polarized in the second polarization orientation.

7. The liquid crystal color display according to claim 5 wherein the image display means includes magnification means for magnifying and projecting the composite full color image onto a viewing surface.

8. The liquid crystal color display of claim 5 wherein the liquid crystal material of the first, second and third voltage responsive liquid crystal panels is twisted nematic liquid crystal material.

9. The liquid crystal color display of claim 5 wherein the red and green color image has a first image resolution, the blue color image has a second image resolution, and the composite full color image has an effective image resolution equal to the first image resolution.

10. The liquid crystal color display according to claim 9 wherein the second image resolution of the blue color image is in a range of from one-half to one-fourth that of the first image resolution of the red and green color image.

11. The liquid crystal color display of claim 9 wherein the second image resolution of the blue color image is lower than the first image resolution of the red and green color image.

12. A liquid crystal color display for producing and displaying a full color image comprising light source means for providing yellow light including a red light component and a green light component along a first optical path, and for providing a blue light component along a second optical path;

a first linear polarizer disposed along the first optical path for polarizing substantially uniformly the red and green light components;

a first voltage responsive liquid crystal panel of nematic liquid crystal material of a twisted configuration (first TNLC panel) positioned for receiving the linearly polarized red and green light components along the first optical path; the first TNLC panel including a first plurality of individually addressable, light modulating display pixels for forming a red and green color image having a first image resolution; each pixel in the first TNLC panel having a voltage modulation element associated therewith for modulating the rotation of polarization of the linearly polarized red and green light components passing therethrough according to the color of the red and green image to be formed;

a first analyzer for receiving the modulated red and green light components from the first TNLC panel, and for controlling the light intensity thereof;

a matrix of red and green color filters, disposed between and aligned with the first TNLC panel and the first analyzer, for controlling transmission of the modulated red and green light components from each display pixel of the first TNLC panel to the first analyzer to produce color in each display pixel; the matrix of red and green color filters being arranged so as to permit at least one of each red and green filter to be integrated by the human eye into a single color along a red to green colorimetric axis;

a second linear polarizer disposed along the second optical path for polarizing substantially uniformly the blue light component received from the light source means;

a second voltage responsive liquid crystal panel of nematic liquid crystal material of a twisted configuration (second TNLC panel) positioned for receiving the linearly polarized blue light component along the second optical path; the second TNLC panel including a second plurality of individually addressable, light modulating display pixels for forming a blue color image having a second image resolution; the second image resolution of the blue color image being lower than the first image resolution of the red and green color image; each display pixel in the second TNLC panel having a voltage modulation element associated therewith for modulating the rotation of polarization of the blue light component passing therethrough according to the blue image to be formed;

a second analyzer disposed along the second optical path for receiving the modulated blue light component from the second TNLC panel, and for controlling the light intensity thereof;

image combination means for receiving the red and green color image and the blue color image from the respective first and second optical paths for combining by additive spatial superposition into a composite full color image having an effective image resolution equal to the first image resolution; and image display means, disposed to receive the composite full color image from the image combination means, for receiving and displaying the composite full color image in a manner so as to be visible to a human observer.

13. A liquid crystal color display for producing and displaying a full color image comprising light source means for providing yellow light including a red light component and a green light component along a first optical path, and for providing a blue light component along a second optical path;

a first linear polarizer disposed along the first optical path for polarizing the red and green light components substantially uniformly;

a first voltage responsive liquid crystal panel of nematic liquid crystal material of a twisted configuration (first TNLC panel) positioned for receiving the linearly polarized red and green light components along the first optical path; the first TNLC panel including a first plurality of individually addressable, light modulating display pixels for controlling light intensity of a red and green color image having a first image resolution; each display pixel in the first TNLC panel having a voltage modulation element associated therewith for modulating the rotation of polarization of the linearly polarized red and green light components passing therethrough according to the light intensity of the red and green image to be formed;

a second linear polarizer disposed along the first optical path for polarizing in a first polarization orientation the modulated red and green light components received from the first TNLC panel;

a second voltage responsive liquid crystal panel of nematic liquid crystal material of a twisted configuration (second TNLC panel) positioned along the first optical path to receive the red and green light components from the second polarizer; the second TNLC panel including a second plurality of individually addressable, light modulating display pixels for controlling the production of color in the red and green image along a red to green colorimetric axis; each display pixel in the second TNLC panel having a voltage modulation element associated therewith for modulating the rotation of the polarized red and green light components passing therethrough from the first polarization orientation to a second polarization orientation according to the color of the red and green image to be formed;

wherein the second plurality of individually addressable display pixels of the second TNLC panel are substantially aligned with the first plurality of individually addressable display pixels of the first TNLC panel along the first optical path;

at least two color selecting dye polarizers disposed consecutively along the first optical path to receive the modulated red and green light components from each of the second plurality of display pixels of the second LC panel; the at least two color selecting dye polarizers having transmission axes orthogonally oriented with respect to each other so as to be capable of using the modulated first and second polarization orientations to select in each display pixel one of substantially all colors along the red to green colorimetric axis;

a third linear polarizer disposed along the second optical path for polarizing substantially uniformly the blue light component received from the light source means;

a third voltage responsive liquid crystal panel of nematic liquid crystal material of a twisted configuration (second TNLC panel) positioned for receiving the linearly polarized blue light component along the second optical path; the third TNLC panel including a third plurality of individually addressable, light modulating display pixels for forming a blue color image having a second image resolution; the second image resolution of the blue color image being lower than the first image resolution of the red and green color image; each display pixel in the third TNLC panel having a voltage modulation element associated therewith for modulating the rotation of polarization of the blue light component passing therethrough according to the blue image to be formed;

an analyzer for receiving the modulated blue light component from the third TNLC panel, and for controlling the light intensity thereof;

image combination means for receiving the red and green color image and the blue color image from the respective first and second optical paths for combining by additive spatial superposition into a composite full color image having an effective image resolution equal to the first image resolution; and image display means, disposed to receive the composite full color image from the image combination means, for receiving and displaying the composite full color image in a manner so as to be visible to a human observer.

* * * * *